US008655271B2

(12) United States Patent
Broström

(10) Patent No.: US 8,655,271 B2
(45) Date of Patent: Feb. 18, 2014

(54) SYSTEM AND METHOD FOR STORING NEAR FIELD COMMUNICATION TAGS IN AN ELECTRONIC PHONEBOOK

(75) Inventor: Sofia Broström, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1358 days.

(21) Appl. No.: 11/382,537

(22) Filed: May 10, 2006

(65) Prior Publication Data

US 2007/0265033 A1    Nov. 15, 2007

(51) Int. Cl.
*H04B 5/00* (2006.01)
(52) U.S. Cl.
USPC .......................... 455/41.1; 455/41.3; 455/557
(58) Field of Classification Search
USPC ......... 455/41.1–41.3, 557, 411, 412.1, 414.1, 455/421, 550.1; 340/572.1; 712/26
See application file for complete search history.

(56) References Cited

U.S. PATENT DOCUMENTS

| 6,895,221 | B2 | 5/2005 | Gunnarsson |
| 6,947,571 | B1 | 9/2005 | Rhoads et al. |
| 7,213,766 | B2* | 5/2007 | Ryan et al. ............ 235/492 |
| 2003/0120745 | A1 | 6/2003 | Katagishi et al. |
| 2004/0069852 | A1 | 4/2004 | Seppinen et al. |
| 2004/0116074 | A1 | 6/2004 | Fujii et al. |
| 2004/0166807 | A1* | 8/2004 | Vesikivi et al. ............ 455/41.2 |
| 2005/0064814 | A1 | 3/2005 | Matsuo et al. |
| 2005/0077356 | A1 | 4/2005 | Takayama et al. |
| 2005/0164748 | A1* | 7/2005 | Kitaji ............ 455/572 |
| 2005/0197062 | A1 | 9/2005 | Sprogis |
| 2005/0250445 | A1* | 11/2005 | Hansson ............ 455/41.2 |
| 2006/0052055 | A1 | 3/2006 | Rowse et al. |

FOREIGN PATENT DOCUMENTS

| DE | 10 2004 011 500 | 9/2005 |
| EP | 1 630 757 | 3/2006 |
| GB | 2 376 847 | 12/2002 |
| WO | 2004/021259 | 3/2004 |
| WO | 2004/021259 A1 * | 3/2004 |

OTHER PUBLICATIONS

International Search Report and Written Opinion for International Application No. PCT/IB2006/003145 dated Mar. 16, 2007.
International Preliminary Report on Patentability for International Application No. PCT/IB06/003145 dated Aug. 11, 2008.

* cited by examiner

*Primary Examiner* — Nay A Maung
*Assistant Examiner* — Angelica M Perez
(74) *Attorney, Agent, or Firm* — Renner, Otto, Boisselle & Sklar, LLP

(57) ABSTRACT

Disclosed is a system, method and computer application for exchanging information using near field communications. In one aspect, the method comprises: transmitting a request for information from a mobile telephone through a near field communication (NFC) adapter associated with the mobile telephone. Information is then received in response to the request for information by the NFC adapter from an electronic device. The NFC tag of the electronic device is stored in the electronic phonebook of the mobile telephone. Storage of the NFC tag may be automatically and/or manually. After the initial storing of the information in the electronic phonebook, future communications between the mobile telephone and the electronic device and/or user utilize a user-friendly designation (e.g., contact information) to inform the mobile telephone user when the devices are in range for communication.

17 Claims, 4 Drawing Sheets

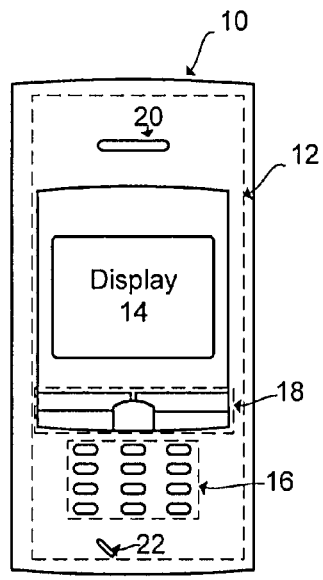
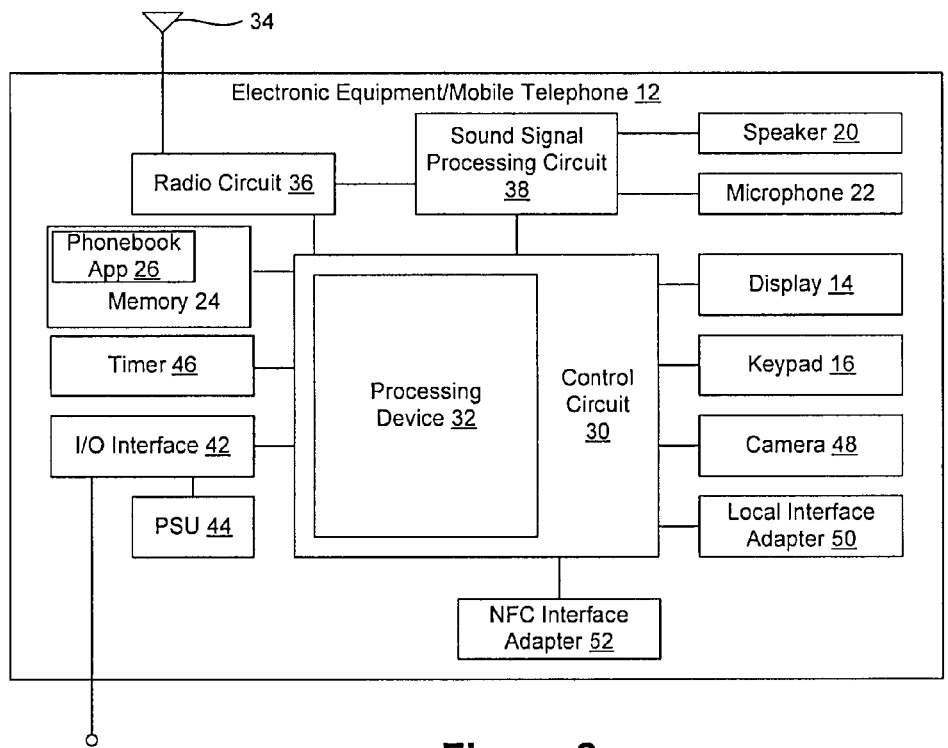
Figure 1
Figure 2

| Entry # | Contact Name | Telephone #1 | Telephone #2 | Telephone #3 |
|---|---|---|---|---|
| 1 | Jane Doe | 440 123-5678 | | |
| 2 | Alan | 330 987-1234 | 216 621-1113 | |
| 3 | Zack | 908 678-9012 | | |
| 4 | Mo Rice | 525 696-3427 | 647 111-1111 | 647 121-8888 |
| * | * | * | * | |
| * | * | * | * | |
| * | * | * | * | |
| N | Paige | 123 987-6543 | 867 530-9121 | |

| Entry # | Contact Name | Telephone #1 | Telephone #2 | Telephone #3 | NFC Tag |
|---|---|---|---|---|---|
| 1 | Jane Doe | 440 123-5678 | | | 440 123-5678 |
| 2 | Alan | 330 987-1234 | 216 621-1113 | | AFDWDI |
| 3 | Zack | 908 678-9012 | | | 1-2-4-9090 |
| 4 | Mo Rice | 525 696-3427 | 647 111-1111 | 647 121-8888 | |
| * | * | * | * | | * |
| * | * | * | * | | * |
| * | * | * | * | | * |
| N | Paige | 123 987-6543 | 867 530-9121 | | 123 987-6543 |

SYSTEM AND METHOD FOR STORING NEAR FIELD COMMUNICATION TAGS IN AN ELECTRONIC PHONEBOOK

TECHNICAL FIELD OF THE INVENTION

The present invention relates to a method and apparatus for storing near field communication tags in an electronic phonebook application of a mobile telephone.

DESCRIPTION OF THE RELATED ART

Electronic equipment, such as, for example, communication devices, mobile phones, personal digital assistants, etc. are typically equipped to communicate with cellular telephone communication networks. Such electronic equipment are increasingly being equipped with adapters to support advanced communications in a variety of mediums. Such advanced communication mediums may include, for example, Bluetooth, 802.11, wireless local area networks (WLANs), WiFi and WiMax.

Another communication medium currently being implemented in electronic equipment is near field communication (NFC). The use of NFC interfaces in electronic equipment provides portable devices with functions similar to those of non-contact integrated circuit cards (e.g., radio frequency identification (RFID) cards). In addition, electronic equipment provided with NFC interfaces are typically capable of operating as radio frequency readers and/or writers to communicate with other NFC devices.

One problem associated with electronic equipment having a NFC interface is security. It is generally difficult for users of electronic equipment having a NFC interface to discern whether NFC transactions are secure. Another problem associated with electronic equipment having a NFC interface is that when information is exchanged between NFC-compliant devices, the exchanged information is technical in nature and not easily understandable by the users of NFC devices.

SUMMARY

In view of the aforementioned shortcomings associated with NFC devices, there is a strong need in the art for a mechanism to unambiguously identify NFC devices in a non-technical manner.

One aspect of the present invention is directed to a mobile telephone having an improved electronic phonebook application for storing near field communication (NFC) tags in the electronic phonebook.

Another aspect of the invention is directed to automatically storing a NFC tag associated with an electronic device in the electronic phonebook of the mobile telephone when the mobile telephone is within a near field communication range of an NFC-compliant device.

Another aspect of the invention is to provide a user-friendly designation associated with the NFC tag to make an associated user aware of the electronic device in which the mobile telephone is in communication.

Another aspect of the invention relates to a method of exchanging information, the method comprising: transmitting a request for information from a mobile telephone, where the request is transmitted through a near field communication (NFC) adapter associated with the mobile telephone; receiving information in response to the request for information by the NFC adapter from the electronic device, wherein the received information is a NFC signal; storing at least a portion of the received information in an electronic phonebook application associated with the mobile telephone.

According to an aspect of the invention, a NFC tag associated with the contact is stored in the electronic phonebook application.

According to an aspect of the invention, the NFC tag includes unique information related to at least one of the electronic device or the associated user of the electronic device.

According to an aspect of the invention, the presence and/or absence of an electronic device is determined prior to the transmitting a request step.

According to an aspect of the invention, a query is displayed on a display of the mobile telephone in a user-sensible format to an associated user.

According to an aspect of the invention, receiving user input from a user input device of the mobile telephone in response to the query, wherein the user input corresponds to a user-friendly designation representing at least one of the electronic device or the contact.

According to an aspect of the invention, storing the user input in the electronic phonebook application.

According to an aspect of the invention, wherein the received information is an electronic business card.

According to an aspect of the invention, wherein the electronic business card includes a user-friendly designation representing at least one of the electronic device or the contact.

According to an aspect of the invention, wherein the received information is a telephone number associated with electronic device.

According to an aspect of the invention, a user-sensible message confirming that the received information has been stored.

According to an aspect of the invention, at least a portion of the received information is stored automatically without user intervention.

According to an aspect of the invention, including prompting an associated user to associate the at least a portion of the received information with a contact in the electronic phonebook.

Another aspect of the invention relates to a method of exchanging information, the method comprising: transmitting a request for information from a mobile telephone, where the request is transmitted through a near field communication (NFC) adapter associated with the mobile telephone; receiving information in response to the request for information by the NFC adapter from an electronic device, wherein the received information is a NFC signal; determining that information associated with the electronic device has previously been stored in the electronic phonebook application of the mobile telephone, wherein a user-friendly designation has been associated with the electronic device; and providing an indication that the electronic device has previously been communicatively coupled with the mobile telephone.

According to an aspect of the invention, the indication is a message displayed to an associated user on a display of the mobile telephone.

According to an aspect of the invention, transmitting information from the mobile telephone to the electronic device and displaying the user-friendly designation on the display during at least a portion of the transmission.

According to an aspect of the invention, receiving information from the electronic device to the mobile telephone and displaying the user-friendly designation on the display of the mobile telephone during at least a portion of the transmission.

According to an aspect of the invention, storing at least a portion of the received information in an electronic phonebook application associated with the mobile telephone.

According to an aspect of the invention, transmitting information from the mobile telephone in a Bluetooth protocol to the electronic device once the mobile telephone determines that information associated with the electronic device has previously been stored in the electronic phonebook application of the mobile telephone.

Another aspect of the invention relates to a mobile telephone comprising: a memory; an electronic phonebook stored in the memory, wherein the electronic phonebook includes at least one entry having a user-friendly designation and a corresponding near field communication (NFC) tag, wherein the NFC tag was received from an electronic device through a near field communication.

Another aspect of the invention relates to a computer program stored on a machine readable medium, the program being suitable for use in an electronic equipment as an electronic phonebook including a plurality of contacts having a plurality of entries including a NFC tag, wherein: when the electronic phonebook is able to store the NFC tag received from an electronic device through a near field communication.

According to an aspect of the invention, associating a user-friendly designation with the NFC tag and storing the user-friendly designation in the electronic phonebook.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal, includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 1 and 2 are exemplary schematic diagrams illustrating electronic equipment in accordance with aspects of the present invention.

DETAILED DESCRIPTION OF EMBODIMENTS

Figures 3, 4:
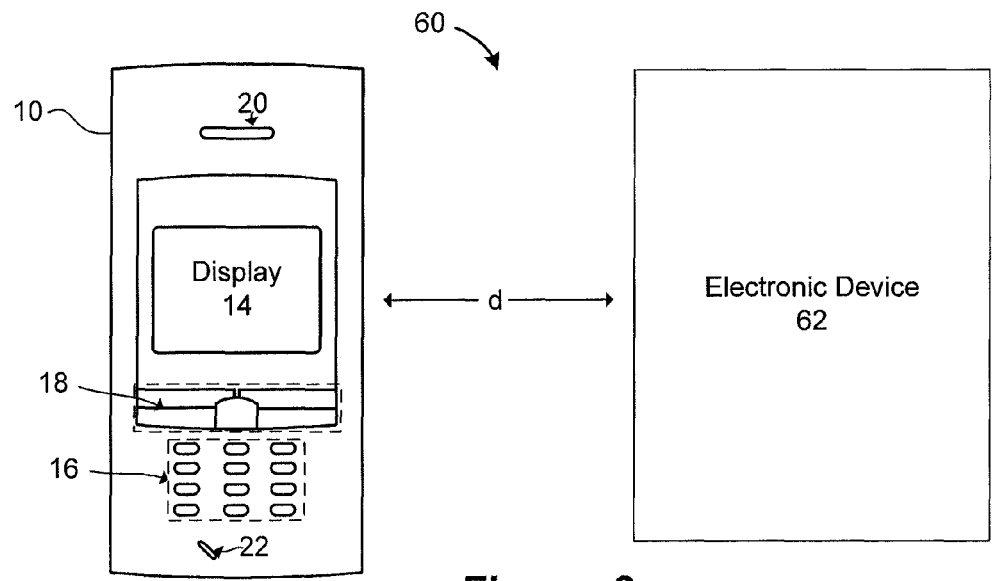
FIG. 3 is an exemplary illustration of a near field communication system in accordance with aspects of the present invention.
FIG. 4 is a conventional and is a conventional electronic phonebook application.

The present invention is directed to electronic equipment 10, sometimes referred to herein as a communication device, mobile telephone, and portable telephone having an improved electronic phonebook application for storing near field communication (NFC) tags in the electronic phonebook. In one aspect of the invention, an NFC tag associated with an electronic device is automatically stored in the electronic phonebook of the mobile telephone when the mobile telephone is within a near field communication range of an NFC-compliant device. Another aspect of the invention is to provide a user-friendly designation to make an associated user aware of the electronic device in which the mobile telephone is in communication.

Referring to FIG. 1, electronic equipment 10 is shown in accordance with the present invention. The electronic equipment 10 in the exemplary embodiment is a mobile telephone and will be referred to as the mobile telephone 10. The mobile telephone 10 is shown as having a "brick" or "block" design type housing, but it will be appreciated that other type housings, such as clamshell housing or a slide-type housing, may be utilized without departing from the scope of the invention.

As illustrated in FIG. 1, the electronic equipment 10 may include a user interface 12 (identified by dotted lines) that enables the user easily and efficiently to perform one or more communication tasks (e.g., identify a contact, select a contact, make a telephone call, receive a telephone call, establish and manage NFC-related exchanges of information, etc). The user interface 12 of the electronic equipment 10 generally includes one or more of the following components: a display 14, an alphanumeric keypad 16, function keys 18, a navigation tool 19, a speaker 20, and/or a microphone 22.

The mobile telephone 10 includes a display 14. The display 14 displays information to a user such as operating state, time, telephone numbers, contact information, various navigational menus, status of one or more functions, etc., which enable the user to utilize the various features of the mobile telephone 10. The display 14 may also be used to visually display content accessible by the mobile telephone 10. The displayed content may include E-mail messages, audio and/or video presentations stored locally in memory 24 (FIG. 2) of the mobile telephone 10 and/or stored remotely from the mobile telephone 10 (e.g., on a remote storage device, a mail server, remote personal computer, etc.). Such presentations may be derived, for example, from NFC-related exchanges of information, from multimedia files received through E-mail messages, including audio and/or video files, from a received mobile radio and/or television signal, etc. The audio component may be broadcast to the user with a speaker 20 of the mobile telephone 10. Alternatively, the audio component may be broadcast to the user though a headset speaker (not shown).

The mobile telephone 10 further includes a keypad 16 that provides for a variety of user input operations. For example, the keypad 16 may include alphanumeric keys for allowing entry of alphanumeric information such as user-friendly identification of contacts, user-friendly identification of contacts, E-mail addresses, distribution lists, telephone numbers, phone lists, contact information, notes, etc. In addition, the keypad 16 typically may include special function keys such as a "call send" key for transmitting an E-mail, initiating or answering a call, and a "call end" key for ending, or "hanging up" a call. Special function keys may also include menu navigation keys, for example, for navigating through a menu displayed on the display 14 to select different telephone functions, profiles, settings, etc., as is conventional. Other keys associated with the mobile telephone 10 may include a volume key, audio mute key, an on/off power key, a web browser launch key, an E-mail application launch key, a camera key, etc. Keys or key-like functionality may also be embodied as a touch screen associated with the display 14.

The mobile telephone 10 also includes conventional call circuitry that enables the mobile telephone 10 to establish a call, transmit and/or receive E-mail messages, and/or exchange signals with a called/calling device, typically another mobile telephone or landline telephone. However, the called/calling device need not be another telephone, but may be some other electronic device such as an NFC-compliant electronic device, Internet web server, E-mail server, content providing server, etc.

Referring to FIG. 2, a functional block diagram of the mobile telephone 10 is illustrated. The mobile telephone 10 includes a primary control circuit 30 that is configured to carry out overall control of the functions and operations of the mobile telephone 10. The control circuit 30 may include a processing device 32, such as a CPU, microcontroller or microprocessor. The processing device 32 executes code stored in a memory (not shown) within the control circuit 30 and/or in a separate memory, such as memory 24, in order to carry out operation of the mobile telephone 10. The processing device 32 is generally operative to perform all of the functionality disclosed herein.

The memory 24 may be, for example, a buffer, a flash memory, a hard drive, a removable media, a volatile memory and/or a non-volatile memory. In addition, the processing device 32 executes code to carry out various functions of the mobile telephone 10.

Continuing to refer to FIGS. 1 and 2, the mobile telephone 10 includes an antenna 34 coupled to a radio circuit 36. The radio circuit 36 includes a radio frequency transmitter and receiver for transmitting and receiving signals via the antenna 34 as is conventional. The mobile telephone 10 generally utilizes the radio circuit 36 and antenna 34 for voice, Internet and/or E-mail communications over a cellular telephone network. The mobile telephone 10 further includes a sound signal processing circuit 38 for processing the audio signal transmitted by/received from the radio circuit 36. Coupled to the sound processing circuit 38 are the speaker 20 and a microphone 22 that enable a user to listen and speak via the mobile telephone 10 as is conventional. The radio circuit 36 and sound processing circuit 38 are each coupled to the control circuit 30 so as to carry out overall operation.

The mobile telephone 10 also includes the aforementioned display 14 and keypad 16 coupled to the control circuit 30. The mobile telephone 10 further includes an I/O interface 42. The I/O interface 42 may be in the form of typical mobile telephone I/O interfaces, such as a multi-element connector at the base of the mobile telephone 10. As is typical, the I/O interface 42 may be used to couple the mobile telephone 10 to a battery charger to charge a power supply unit (PSU) 44 within the mobile telephone 10. In addition, or in the alternative, the I/O interface 42 may serve to connect the mobile telephone 10 to a wired personal hands-free adaptor, to a personal computer or other device via a data cable, etc. The mobile telephone 10 may also include a timer 46 for carrying out timing functions. Such functions may include timing the durations of calls, generating the content of time and date stamps, etc.

The mobile telephone 10 may include various built-in accessories, such as a camera 48 for taking digital pictures. Image files corresponding to the pictures may be stored in the memory 24. In one embodiment, the mobile telephone 10 also may include a position data receiver (not shown), such as a global positioning satellite (GPS) receiver, Galileo satellite system receiver or the like.

To establish wireless communication with other locally positioned devices, such as a wireless headset, another mobile telephone, a computer, etc., the mobile telephone 10 may include a local wireless interface adapter 50. The wireless interface adapter 50 may be any adapter operable to facilitate communication between the mobile telephone 10 and an electronic device. For example, the wireless interface adapter 50 may support communications utilizing Bluetooth, 802.11, WLAN, Wifi, WiMax, etc.

To establish near field communications (NFC) with other locally positioned electronic devices, such as a NFC-enabled and/or NFC-compliant electronic devices and the like, the mobile telephone 10 may further include a NFC interface adapter 52. As used herein, the phrases "NFC-enabled" and "NFC-compliant" may be used interchangeably and refer to devices that are capable of communicating with other devices using one or more near field communication protocols. Preferably, the NFC interface adapter 52 is compatible with one or more NFC related protocols and allows the mobile telephone 10 to communicate with other NFC-enabled and/or compliant devices. As used herein, the phrase "near field communication" and its acronym "NFC" fully comprises all of the communication features and functions associated with radio frequency identification (RFID) and any other near field communication protocols.

The mobile telephone 10 may also be configured to operate in a wide area communications system (e.g. 3G, GPRS) (not illustrated). The system can include a server or servers for managing calls, Internet access and/or E-mails placed by and/or destined to the mobile telephone 10, transmitting content (e.g., image files, audio files, video files, etc.) to and/or from the mobile telephone 10 and carrying out any other support functions. The server generally communicates with the mobile telephone 10 via a network and a transmission medium. The transmission medium may be any appropriate device or assembly, including, for example, a communications tower, another mobile telephone, a wireless access point, a satellite, etc. Portions of the network may include wireless transmission pathways.

FIG. 3 illustrates an exemplary near field communication system 60 in accordance with the present invention. The system 60 consists of a mobile telephone 10 and an electronic device 62. The electronic device 62 may be any electronic device having NFC capabilities. For example, the electronic device 62 may be a personal digital assistant (PDA), a personal computer (PC), a mobile telephone, a wristwatch, a pen, or other communication device. The mobile telephone 10 and the electronic device 62 are adapted to perform near field communication based on electromagnetic induction making use of the carrier waves of a single frequency with other NFC apparatuses. The frequency of the carrier waves used by the mobile telephone 10 and the electronic device 62 may be any suitable frequency. For example, one such suitable frequency is 13.56 MHz, which is in the industrial scientific medical (ISM) band.

As one of ordinary skill in the art will appreciate, near field communication means the communication that can be accomplished when the distance "d", as illustrated in FIG. 3, between communicating apparatuses is several tens of centimeters or less, and it includes the communication accomplished through the contact between communicating apparatuses or between their housings.

The communication system illustrated in FIG. 3 may be used as an IC card system in which one or more of the NFC-compliant devices (e.g. mobile telephone 10 and electronic device 62 function as readers/writers, while the remaining one or more function as IC cards. Generally, NFC-compliant devices permit communication in two communication modes (e.g., active and passive modes) and also permit data transmission at a plurality of transmission rates.

In the passive mode, the mobile telephone 10 may modulate the carrier waves corresponding to the electromagnetic waves that it generates, so as to send data to the electronic device 62. The electronic device 62 generally modulates the carrier waves corresponding to the electromagnetic waves generated by the mobile telephone 10 and sends the resulting information, in the form of a NFC tag to the mobile telephone 10.

In the active mode, mobile telephone 10 and electronic device 62 both modulate the carrier waves corresponding to the electromagnetic waves generated by themselves so as to send information (e.g., NFC tags). When the near field communication based on electromagnetic induction is performed, the apparatus that outputs electromagnetic waves first to initiate the communication and may be said to take the initiative is called an initiator. The initiator transmits a command to a communicating party, and the communicating party sends a response associated with the command so as to establish the near field communication. The communicating party who sends the response to the command received from the initiator is called a target. For example, if mobile telephone 10 begins outputting electromagnetic waves to start communication with the electronic device 62, then the mobile telephone 10 will be the initiator and the electronic device 62 will be the target.

In the passive mode, the mobile telephone 10, which is the initiator, continues outputting electromagnetic waves. The mobile telephone 10 modulates the electromagnetic waves generated by itself so as to send data to the electronic device 62, which is the target. The electronic device 62 carries out load-modulation on the electromagnetic waves output from the mobile telephone 10, which is the initiator, and sends information to the mobile telephone 10.

In the active mode, when the mobile telephone 10, which is the initiator, sends information, it generally first starts outputting electromagnetic waves by itself, and modulates the generated electromagnetic waves so as to send data to the target, i.e., the electronic device 62. The mobile telephone 10 may stop outputting electromagnetic waves after the completion of the transmission of data. When the electronic device 62, which is the target, sends data, it begins outputting electromagnetic waves by itself, and modulates the electromagnetic waves so as to send data to the mobile telephone 10, which is the initiator. The electronic device 62 may stops the output of the electromagnetic waves after the transmission of data is finished.

One of ordinary skill in the art will readily appreciate that the above discussion is exemplary in nature and in no way is intended to limit the scope of the present invention. Likewise, one of ordinary skill in the art will readily appreciate that the NFC tag transmitted from one NFC-compliant device to another may contain a variety of information. Such information may include, for example, a number or identification that is unique to the NFC-adapter, a telephone number, a serial number, a model number, etc.

Aspect of the present invention relate to storing the NFC tag of an electronic device (e.g., electronic device 62) in an electronic phonebook. The step of storing may occur automatically when the electronic device is within the near field communication range of the mobile telephone. In addition, the step of storing may be also manual and/or a combination of automatic and/or manual.

As shown in FIG. 4, a conventional electronic phonebook 70 can accommodate a plurality of contacts, with each of the contacts including a variety of fields. For example, as shown in FIG. 4, the conventional phonebook 70 includes a plurality of contacts. Each contact generally includes one or more associated fields. Such fields may include, for example, entry number, contact name, and one or more telephone numbers, ring tones, pictures, e-mail addresses, home address, electronic business cards and the like. Mobile phone users routinely make use of the phonebook function for convenience. Typically electronic phonebooks organize and display contacts based on when the contact information was entered into the phonebook or organized in alphabetical order based on contact name.

Figures 5, 6:
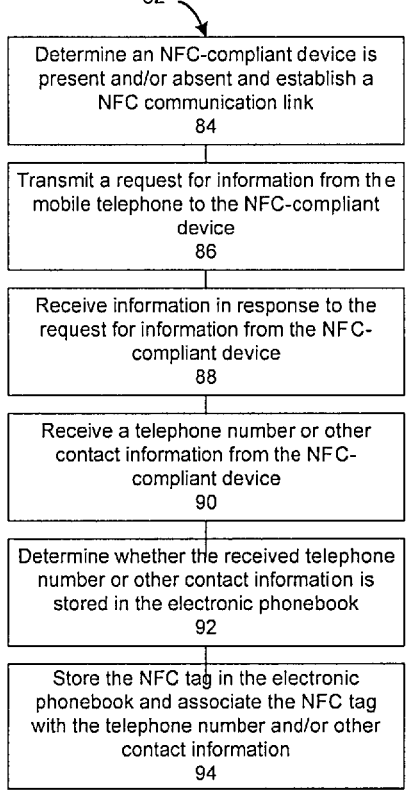
FIG. 5 is an exemplary electronic phonebook application in accordance with aspects of the present invention.
FIGS. 6, 7 and 8 are flow charts illustrating exemplary methods in accordance with aspects of the present invention.

Referring to FIG. 5, an exemplary electronic phonebook 80 in accordance with aspects of the present is illustrated. The electronic phonebook 80 may allow conventional inputting of information for population of the phonebook. For example, the user may manually enter information (e.g., contact name, telephone number, electronic mail address, business card, and the like); the user may also electronically synchronize the electronic phonebook 80 with a remote device (e.g., a personal computer) that contains information for downloading to the electronic phonebook 80.

The electronic phonebook 80 may also use one or more near field communication protocols to populate one or more contacts and/or entries of the electronic phonebook 80. Near field communication may be used to exchange information (e.g., NFC tags, telephone numbers, contact information, electronic business cards, etc.) between mobile telephone 10 and any NFC-compliant device.

An exemplary illustration of an electronic phonebook 80 for storing NFC tags is shown in FIG. 5. As stated above, since NFC tags are generally technical in nature, aspects of the present invention relate to automatically associating the NFC tags with user-friendly information (e.g., contact information) that facilitates identification of the user and/or device when the user of the mobile telephone 10 is within a geographical range of an NFC-compliant device. In some applications, it may be undesirable to allow the user of the electronic phonebook 80 to have access to the NFC tags stored in the electronic phonebook 80. In some advanced technical and/or administrative application, the electronic phonebook application designer may provide the user with access to stored NFC tags in the electronic phonebook 80 (e.g., allowing the user to view the NFC tag on the display 14, allowing the user to organize the contact information based upon the NFC tag, etc.).

An exemplary method 82 in accordance with aspects of the present invention is illustrated. Referring to FIGS. 3 and 6, at step 84, the mobile telephone 10 determines that a NFC-compliant device is present and establishes a near field communication link. One of ordinary skill in the art will readily appreciate that there are a variety of ways to detect presence and/or absence of an NFC-compliant device. All such methods fall within the scope of the present invention.

At step 86, a request for information is transmitted from the mobile telephone 10 to the NFC-compliant device (e.g., electronic device 62). The request is typically transmitted through a NFC adapter (e.g., near field adapter 52) associated with the mobile telephone 10. The request may be sent automatically by continuously transmitting requests until a response is detected, automatically determining the presence of another NFC-compliant device, and/or manually initiated by a user action.

At step 88, the NFC adapter 52 of the mobile telephone 10 (e.g., NFC adapter 52) receives information in response to the request for information from the NFC-compliant electronic device. The received information is in the form of a NFC signal. The received information may include a NFC tag, telephone number and/or any other desired information.

At step 90, the mobile telephone 10 receives a telephone number or other contact information from the NFC-compliant device. As one of ordinary skill in the art will readily appreciate, the step of receiving information in response at step 88 may also include receiving a telephone number or other contact information from the NFC-compliant device.

At step 92, the mobile telephone determines if the telephone number or other contact information is stored in the electronic phonebook 80. If the telephone number or other contact information is stored in the electronic phonebook 80, at step 94, the electronic phonebook stores the NFC tag for the NFC-compliant device and associates the NFC-tag with user-friendly contact information.

Likewise, if the telephone number or other contact information has a different NFC tag associated than the newly received NFC tag, the electronic phonebook 80 may overwrite the previously stored NFC tag with the newly received NFC tag. In this way, the electronic phonebook 80 will maintain the current NFC tag associated with the telephone number and/or other associated contact information.

The exemplary method 82 preferably occurs automatically when the mobile telephone 10 comes within a distance "d" (as denoted in FIG. 3) of another NFC-compliant device. The method may be initiated by any desired mechanism. For example, a request may be sent automatically by continuously transmitting requests until a response is detected, automatically determining the presence and/or absence of another NFC-compliant device, and/or manually initiated by a user action, etc.

It is also preferable that the exemplary method 82 occurs seamlessly and without user intervention. Thus, when the mobile telephone 10 comes within a distance "d" of another NFC-compliant device, the NFC tag associated with the NFC-compliant device is stored in the electronic phonebook 80 and associated with one or more contacts contained in the electronic phonebook 80. Accordingly, the NFC tag received from the NFC-compliant device is associated with user-friendly information that facilitates identification of the user and/or device for future communications.

Figure 7:
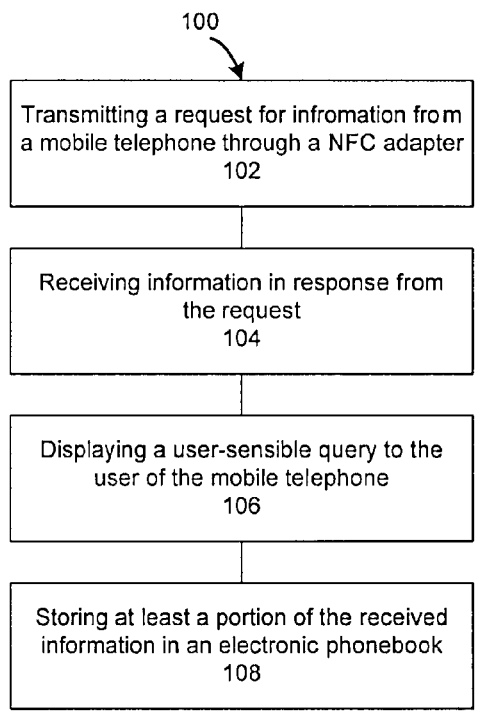

Another exemplary method 100 in accordance with aspects of the present invention is illustrated in FIG. 7. The method 100 allows two NFC-compliant devices to exchange information.

At step 102, a request for information is transmitted from a mobile telephone 10, where the request is transmitted through a near field communication (NFC) adapter 52 associated with the mobile telephone 10. The request may be sent automatically by continuously transmitting requests until a response is detected, automatically determining the presence of another NFC-compliant device, and/or manually initiated by a user action.

At step 104, the NFC adapter 53 receives information in response to the request for information from an electronic device, wherein the received information is a NFC signal. The information may include a NFC tag, telephone number, or any other information.

At step 106, a user-sensible query is displayed on the display 14. The query is presented in a user-sensible format on the display of the mobile telephone to an associated user. In response to the query, the user will generally enter user input from the keypad 16. Such user input will generally correspond to a user-friendly designation representing at least one of the electronic device and/or the contact. Such user-friendly designation will typically include, for example, a name, a nickname, acronym, and/or other indicia which the user of the mobile telephone 10 may use to easily refer to the user and/or another NFC-compliant device (e.g. electronic device 62).

For example, if the NFC tag includes the other user and/or device's telephone number, the display may prompt the user of the mobile telephone 10 to save the telephone number to the list of contacts in the electronic phonebook application 80. If the user decides to save the number to the list of contacts in the electronic phonebook application 80, the user will be queried to enter a user-friendly designation (e.g., name, nickname, etc.) for the contact.

In a similar manner, if the NFC tag does not include the user and/or device's telephone number, the display may prompt the user of the mobile telephone 10 to save the identity of the NFC to the electronic phonebook 80 and also provide one or more graphical user screens on the display to enter such information as a user-friendly designation, telephone number and the like.

At step 108, the electronic phonebook stores at least a portion of the received information from another NFC-compliant device 62 in the electronic phonebook application 80. During the storing step, it may preferable for the display 14 to display a message that the information was stored in the electronic phonebook 80.

Preferably, the contact information entered by user (e.g., user input) is used by electronic phonebook 80 to identify the NFC-compliant device in future communications. For example, if the mobile telephone 10 is transferring a song, for example, to a NFC-compliant device already stored in the electronic phonebook application 80, the display 14 will identify the contact name of the individual and/or device prior to and/or during at least a portion of the song transfer.

Figure 8:
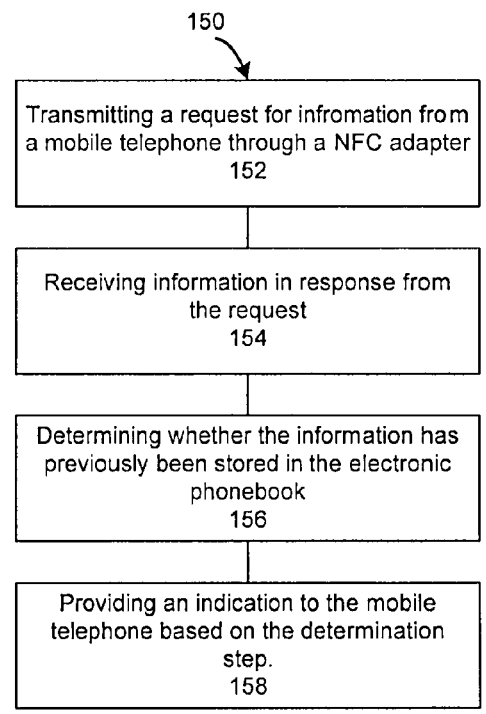

Another exemplary method 150 in accordance with aspects of the present invention is illustrated in FIG. 8.

At step 152, a request for information is transmitted from a mobile telephone 10, where the request is transmitted through a near field communication (NFC) adapter 52 associated with the mobile telephone 10. The request may be sent automatically by continuously transmitting requests until a response is detected, automatically determining the presence of another NFC-compliant device, and/or manually initiated by a user action.

At step 154, the NFC adapter 53 receives information in response to the request for information from an electronic device 62, wherein the received information is a NFC signal. The information may include a NFC tag, telephone number, or any other information.

At step 156, determining that information associated with the electronic device 62 has previously been stored in the electronic phonebook application 80 of the mobile telephone 10 and a user-friendly designation has been associated with the electronic device 62.

At step 158, providing an indication to the user that the electronic device 62 previously has been communicatively coupled to the mobile telephone 10. The indication may be any suitable indication mechanism. For example, an indication may be a message (e.g., information, query, status, statement, etc.) displayed on the display 14. Such a message may include, for example, "Welcome back ANNA", assuming the contact name associated with the NFC tag was ANNA, "In Contact with ANNA", "Do you wish to exchange information with ANNA?", etc.) and/or an audible indication (e.g. a beep, a tone, a song, etc.). The indication may be provided for a period prior to initiation of a transfer of information, the entire period the mobile telephone 10 is connected to the electronic device associated with the ANNA designation, and/or the indication may be provided for only a portion of the period that the mobile telephone 10 is connected to the electronic device associated with the ANNA designation.

In another embodiment, once it has been determined that the device has been stored in the electronic phonebook and that both NFC-compliant devices (e.g., mobile telephone 10 and electronic device 62) have other communication capabilities (e.g., wireless local area network, Bluetooth, 802.11, WiFi, and/or WiMax capabilities), the NFC-compliant device may utilize one or more other such protocols for facilitating exchanging information. A benefit of using the other communication protocols is that the devices do not have to maintain as close a proximity to each other as required by a near field communication link Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A method of exchanging information, the method comprising:
    transmitting a request for information from a first mobile telephone to a second mobile telephone, wherein the request is transmitted through a near field communication (NFC) adapter associated with the first mobile telephone when the first mobile telephone is within NFC range of the second mobile telephone and;
    receiving information in response to the request for information by the NFC adapter from the second mobile telephone, wherein the received information is a NFC tag associated with the second mobile telephone;
    storing the NFC tag associated with the second mobile telephone in an electronic phonebook application stored in the first mobile telephone, wherein the electronic phonebook includes at least one contact; and the NFC tag associated with the second mobile telephone is associated with the at least one contact stored in the electronic phonebook application; and
    displaying a query on a display of the first mobile telephone in a user-sensible format to an associated user of the first mobile telephone when the second mobile telephone associated with the NFC tag stored in the electronic phonebook application is within NFC range to facilitate identification of the second mobile telephone to the associated user of the first mobile telephone.

2. The method of claim 1, wherein the NFC tag includes unique information related to at least one of the second mobile telephone or a user of the second mobile telephone.

3. The method of claim 1 further including determining presence and/or absence of second mobile telephone, prior to the transmitting a request step.

4. The method of claim 1 further including receiving user input from a user input device of the first mobile telephone in response to the query, wherein the user input corresponds to a user-friendly designation representing at least one of the second mobile telephone or the contact.

5. The method of claim 4 further including storing the user input in the electronic phonebook application.

6. The method of claim 1, wherein the received information is an electronic business card.

7. The method of claim 6, wherein the electronic business card includes a user-friendly designation representing at least one of the second mobile telephone or the contact.

8. The method of claim 1, wherein the received information is a telephone number associated with the second mobile telephone.

9. The method of claim 1, further including a user-sensible message confirming that the received information has been stored.

10. The method of claim 1, wherein the step of storing at least a portion of the received information occurs automatically without user intervention.

11. The method of claim 1 further including prompting an associated user to associate the at least a portion of the received information with the contact in the electronic phonebook.

12. The method of claim 1, further including initiating a communication session by the first mobile telephone after the NFC tag associated with the second mobile telephone has been stored in the electronic phonebook application of the first mobile telephone.

13. The method of claim 12, further including receiving a user input from in response to the query prior to establishing the communication session, wherein user input is indicative of the user of the first mobile telephone desiring to establish the communication session with the second mobile telephone.

14. The method of claim 1, further including initiating a communication session by the first mobile telephone after the NFC tag associated with the second mobile telephone has been stored in the electronic phonebook application of the first mobile telephone.

15. The method of claim 14, further including receiving a user input from in response to the query prior to establishing the communication session, wherein user input is indicative of the user of the first mobile telephone desiring to establish the communication session with the second mobile telephone.

16. A non-transitory computer program stored on a machine readable medium comprising, the computer program being suitable for use in a mobile telephone as an electronic phonebook application, wherein:
when the computer program is loaded in a memory of the mobile telephone and executed causes the mobile telephone to:
transmit a request for information from the mobile telephone to a second mobile telephone, wherein the request is transmitted through a near field communication (NFC) adapter associated with the mobile telephone when the mobile telephone is within NFC range of the second mobile telephone;
receive information in response to the request for information by the NFC adapter from the second mobile telephone, wherein the received information includes a NFC tag associated with the second mobile telephone;
storing the NFC tag associated with the second mobile telephone in the electronic phonebook application, wherein the electronic phonebook application includes contact information for at least one contact and the NFC tag associated with the second mobile telephone is associated with the at least one contact stored in the electronic phonebook application; and
displaying a query on a display of the mobile telephone in a user-sensible format to an associated user of the mobile telephone when the second mobile telephone associated with the NFC tag stored in electronic phonebook application is within NFC range to facilitate identification of the second mobile telephone to the associated user of the mobile telephone.

17. The non-transitory computer program of claim 16 further including associating a user-friendly designation with the NFC tag and storing the user-friendly designation in the electronic phonebook.

* * * * *